(12) United States Patent
Kobayashi et al.

(10) Patent No.: US 11,205,344 B2
(45) Date of Patent: Dec. 21, 2021

(54) DRIVING BEHAVIOR EVALUATION DEVICE, DRIVING BEHAVIOR EVALUATION METHOD, AND STORAGE MEDIUM

(71) Applicant: TOYOTA JIDOSHA KABUSHIKI KAISHA, Toyota (JP)

(72) Inventors: Yasuhiro Kobayashi, Toyota (JP); Gentaro Kogano, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/945,100

(22) Filed: Jul. 31, 2020

(65) Prior Publication Data

US 2021/0043077 A1 Feb. 11, 2021

(30) Foreign Application Priority Data

Aug. 8, 2019 (JP) .............................. JP2019-146764

(51) Int. Cl.
| | |
|---|---|
| *G08G 1/01* | (2006.01) |
| *G08G 1/052* | (2006.01) |
| *B60W 40/08* | (2012.01) |
| *G01C 21/36* | (2006.01) |
| *B60W 50/14* | (2020.01) |

(52) U.S. Cl.
CPC .............. *G08G 1/052* (2013.01); *B60W 40/08* (2013.01); *B60W 50/14* (2013.01); *G01C 21/36* (2013.01); *B60W 2050/146* (2013.01); *B60W 2540/10* (2013.01)

(58) Field of Classification Search
CPC ...... G08B 1/052; G01C 21/366; G01C 21/36; B60W 50/14; B60W 40/08; B60W 2050/146; B60W 2540/10; B60W 2540/12; B60W 30/18154; B60W 40/09; B60W 2540/106; B60W 2556/50; G08G 1/052; G08G 1/0962; G07C 5/085; G07C 5/0808
USPC .............. 340/936, 937, 903, 905, 998, 995; 701/32.2
See application file for complete search history.

(56) References Cited

U.S. PATENT DOCUMENTS

| | | | | |
|---|---|---|---|---|
| 2011/0102195 A1* | 5/2011 | Kushi | .............. | G08G 1/096783 340/905 |
| 2014/0350777 A1* | 11/2014 | Kawai | .................. | G07C 5/0808 701/32.3 |
| 2018/0224852 A1* | 8/2018 | Tanahashi | .......... | G01C 21/3407 |

FOREIGN PATENT DOCUMENTS

JP 2007-328612 A 12/2007

* cited by examiner

*Primary Examiner* — Tai T Nguyen
(74) *Attorney, Agent, or Firm* — Sughrue Mion, PLLC

(57) ABSTRACT

A driving behavior evaluation device, includes: a memory; and a processor coupled to the memory, the processor being configured to: acquire onboard sensor information that is detected by a sensor installed in a vehicle and that includes a depression amount of an accelerator pedal, acquire map information including information regarding an intersection, and in a case in which an event has been detected, render a lower driving evaluation than in a case in which the event is not detected, the event being an event in which the depression amount of the accelerator pedal increases or decreases at least once within a predetermined time after the vehicle has arrived at a temporary stop position, or has temporarily stopped, at the intersection.

9 Claims, 9 Drawing Sheets

DRIVING BEHAVIOR EVALUATION DEVICE, DRIVING BEHAVIOR EVALUATION METHOD, AND STORAGE MEDIUM

CROSS-REFERENCE TO RELATED APPLICATION

This application is based on and claims priority under 35 USC 119 from Japanese Patent Application No. 2019-146764 filed on Aug. 8, 2019, the disclosure of which is incorporated by reference herein.

BACKGROUND

Technical Field

The present disclosure relates to a driving behavior evaluation device, a driving behavior evaluation method, and a storage medium storing a driving behavior evaluation program.

Related Art

Japanese Patent Application Laid-Open No. 2007-328612 discloses a technique for determining that a two-stage stop is being performed in a case in which the vehicle speed is reduced to a value that may be regarded as zero or substantially zero in accordance with the stop line position and a boundary position based on a transition of the vehicle speed during travel at a temporary stop intersection. In this technology, even if a two-stage stop is not performed, depending on conditions such as the distance between the stop line position and the intersection entrance and whether or not there is a slowdown between the stop line position and the intersection entrance, it is presumed that the driver is performing safe driving behavior.

According to an experiment performed by the inventors of the present application (details will be described later), it is clear that with the technique described in Japanese Patent Application Laid-Open No. 2007-328612 there is a possibility that certain dangerous driving behavior may be inaccurately included among the driving behavior presumed to be safe.

SUMMARY

The present disclosure has been made in view of the above facts, and provides a driving behavior evaluation device, a driving behavior evaluation method, and a storage medium storing a driving behavior evaluation program capable of accurately determining dangerous driving behavior by the elderly and the like, and performing appropriate driving evaluation.

A first aspect of the present disclosure is a driving behavior evaluation device, including: a memory; and a processor coupled to the memory, the processor being configured to: acquire onboard sensor information that is detected by a sensor installed in a vehicle and that includes a depression amount of an accelerator pedal, acquire map information including information regarding an intersection, and in a case in which a first event has been detected, render a lower driving evaluation than in a case in which the first event is not detected, the first event being an event in which the depression amount of the accelerator pedal increases or decreases at least once within a predetermined time after the vehicle has arrived at a temporary stop position, or has temporarily stopped, at the intersection.

In the first aspect, the driving evaluation is rendered based on an increase and/or decrease of a depression amount of an accelerator pedal. This makes it possible to accurately determine dangerous driving behavior by an elderly person or the like and perform appropriate driving evaluation.

In the first aspect, the processor may be further configured to: in a case in which the first event is not detected, determine whether or not a second event has been detected, the second event being an event in which an integrated value of the depression amount of the accelerator pedal is equal to or greater than a threshold value within a predetermined time after the vehicle has arrived at the temporary stop position, or has temporarily stopped, at the intersection and, in a case in which the first event has been detected, or in a case in which the first event is not detected and the second event has been detected, the processor renders a lower driving evaluation than in a case in which neither the first event nor the second event is detected.

In the above-described configuration, in addition to a case in which the first event, in which the accelerator pedal depression amount is increased or decreased at least once within the predetermined time, is detected, the driving evaluation is also determined to be low in a case in which the first event is not detected, but a second event, in which an integrated value of the depression amount of the accelerator pedal is equal to or greater than a threshold value within a predetermined time, is detected. This makes it possible to even more accurately determine dangerous driving behavior by an elderly person or the like and perform appropriate driving evaluation.

A second aspect of the present disclosure is a driving behavior evaluation device, including: a memory; and a processor coupled to the memory, the processor being configured to: acquire onboard sensor information that is detected by a sensor installed in a vehicle and that includes a depression amount of an accelerator pedal, acquire map information including information regarding an intersection, and in a case in which an event has been detected, render a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

In the second aspect, the driving evaluation is rendered based on an integrated value of a depression amount of an accelerator pedal. This makes it possible to accurately determine dangerous driving behavior by an elderly person or the like and perform appropriate driving evaluation.

The first aspect and the second aspect may further include an output unit configured to cause a display unit to display results of the rendered driving evaluation.

In the above-described configuration, a person who has visually perceived the information displayed on the display unit may be made aware of the result of the rendered driving evaluation.

A third aspect of the present disclosure is a non-transitory storage medium storing a program that causes a computer to execute driving behavior evaluation processing, the driving behavior evaluation processing including: acquiring onboard sensor information that is detected by a sensor installed in a vehicle and that includes a depression amount of an accelerator pedal; acquiring map information including information regarding an intersection; and in a case in which a first event has been detected, rendering a lower driving evaluation than in a case in which the first event is not detected, the first event being an event in which the depression amount of the accelerator pedal increases or decreases at least once within a predetermined time after the vehicle has arrived at a temporary stop position, or has temporarily stopped, at the intersection.

In the third aspect, similarly to the first aspect, it is possible to accurately determine dangerous driving behavior by an elderly person or the like and perform appropriate driving evaluation.

A fourth aspect of the present disclosure is a non-transitory storage medium storing a program that causes a computer to execute driving behavior evaluation processing, the driving behavior evaluation processing including: acquiring onboard sensor information that is detected by a sensor installed in a vehicle and that includes a depression amount of an accelerator pedal; acquiring map information including information regarding an intersection; and in a case in which an event has been detected, rendering a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

In the fourth aspect, similarly to the second aspect, it is possible to accurately determine dangerous driving behavior by an elderly person or the like and perform appropriate driving evaluation.

A fifth aspect of the present disclosure is a method of evaluating driving behavior, the method including: acquiring onboard sensor information that is detected by a sensor installed in a vehicle and that includes a depression amount of an accelerator pedal; acquiring map information including information regarding an intersection; and in a case in which a first event has been detected, rendering a lower driving evaluation than in a case in which the first event is not detected, the first event being an event in which the depression amount of the accelerator pedal increases or decreases at least once within a predetermined time after the vehicle has arrived at a temporary stop position, or has temporarily stopped, at the intersection.

A sixth aspect of the present disclosure is a method of evaluating driving behavior, the method comprising: acquiring onboard sensor information that is detected by a sensor installed in a vehicle and that includes a depression amount of an accelerator pedal; acquiring map information including information regarding an intersection; and in a case in which an event has been detected, rendering a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

The present aspects make it possible to accurately determine dangerous driving behavior by an elderly person or the like and perform appropriate driving evaluation.

DETAILED DESCRIPTION

Figure 1:
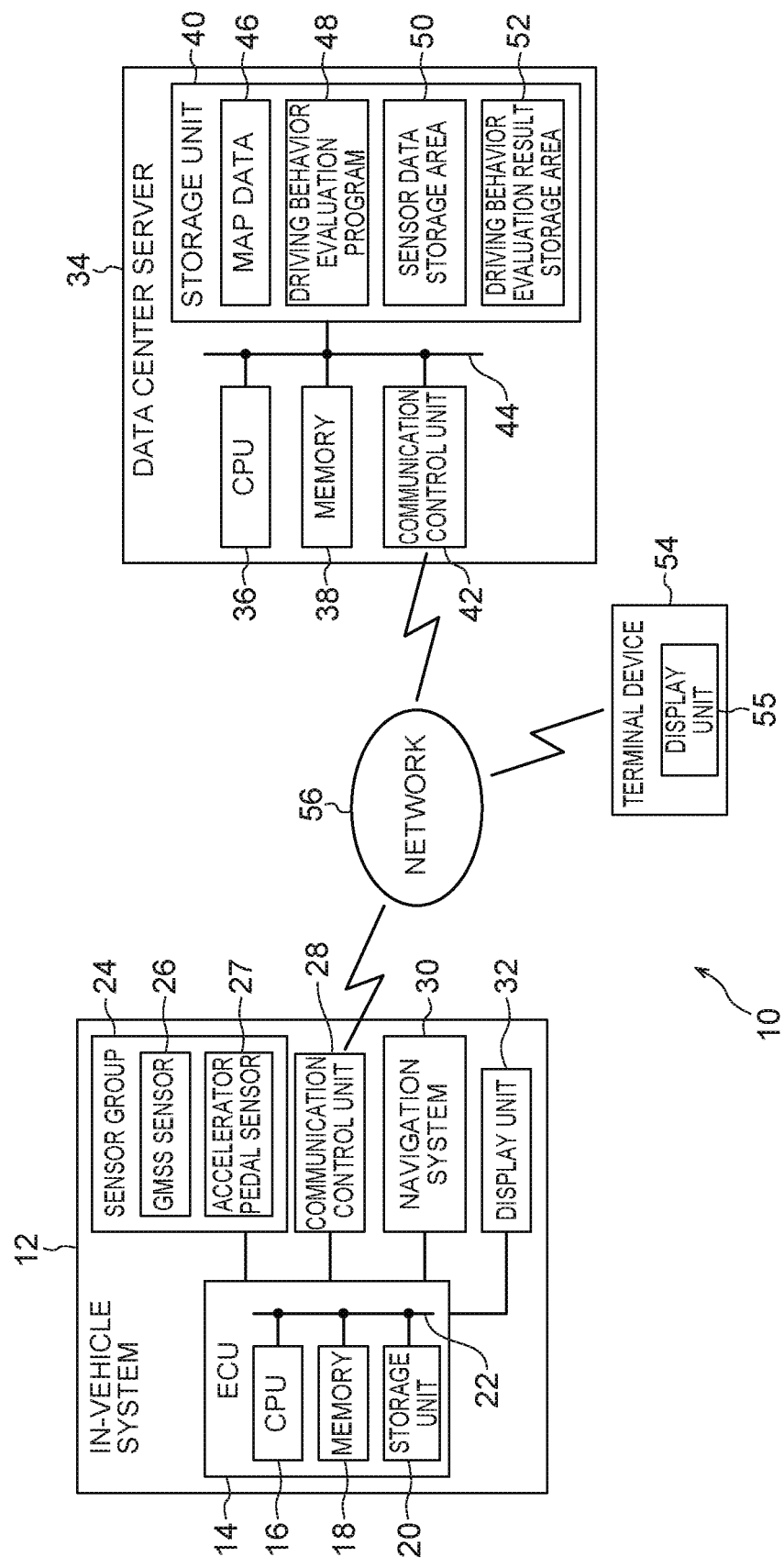
FIG. 1 is a block diagram illustrating a schematic configuration of a driving behavior evaluation system according to an embodiment.

An example of an embodiment of the present invention is described in detail hereinafter with reference to the drawings. As shown in FIG. 1, the driving behavior evaluation system 10 according to the first embodiment includes an in-vehicle system 12 mounted on a vehicle, a data center server 34 (hereinafter simply referred to as a server 34), and a terminal device 54. The in-vehicle system 12, the server 34, and the terminal device 54 may communicate with each other via a network 56. Although only one in-vehicle system 12 is shown in FIG. 1, the in-vehicle system 12 is mounted in each of several vehicles. The terminal device 54 is configured by, for example, a smartphone, includes a display unit 55, and is carried by a family member of a driver who drives a vehicle on which the in-vehicle system 12 is mounted.

The in-vehicle system 12 includes an ECU (Electronic Control Unit) 14. The ECU 14 includes a CPU (Central Processing Unit) 16, a memory 18 such as a ROM (Read Only Memory) and a RAM (Random Access Memory), and a non-volatile storage unit 20 such as an HDD (Hard Disk Drive) and an SSD (Solid State Drive). The CPU 16, the memory 18, and the storage unit 20 are communicably connected to each other via an internal bus 22.

The ECU 14 is connected to a sensor group 24, a communication control unit 28 for controlling communication between the vehicle-mounted system 12 and the server 34 etc., a navigation system 30, and a display unit 32 capable of displaying arbitrary information.

The sensor group 24 includes several types of sensors including a GNSS sensor 26 that receives a positioning signal from a GNSS (Global Navigation Satellite System) satellite and acquires GNSS positioning information, and an accelerator pedal sensor 27 that detects an amount of depression of an accelerator pedal. Besides the GNSS sensor 26 and the accelerator pedal sensor 27, the sensor group 24 includes a vehicle speed sensor that detects the speed of the vehicle, an acceleration sensor that detects the acceleration of the vehicle, a steering angle sensor that detects the steering angle of the vehicle, and a brake pedal sensor that detects the amount of depression of the pedal. Each sensor of the sensor group 24 detects various physical quantities at predetermined time intervals while the ignition switch of the vehicle is on. The ECU 14 transmits sensor data output from the sensor group 24 at predetermined time intervals to the server 34 as needed. Note that the sensor data is an example of vehicle-mounted sensor information.

The navigation system 30 includes a storage unit (not shown) for storing map information. The navigation system 30 displays the position of the vehicle on the map displayed on the display unit 32 based on the GNSS positioning information output from the GNSS sensor 26 and the map information stored in the storage unit, and performs processing for guidance of the route to the destination.

The server 34 includes a CPU 36, a memory 38, a non-volatile storage unit 40, and a communication control unit 42 that manages communication between the server 34 and the vehicle-mounted system 12 etc. The CPU 36, the memory 38, the storage unit 40 and the communication control unit 42 communicate with each other via an internal bus 44. The storage unit 40 stores map data 46 and a driving behavior evaluation program 48, and includes a sensor data storage area 50 and a driving behavior evaluation result storage area 52.

The map data 46 includes, as information of an intersection existing on the map represented by the map data 46, information indicating the position of the intersection and the position of the stop line provided at the intersection.

Figure 2:
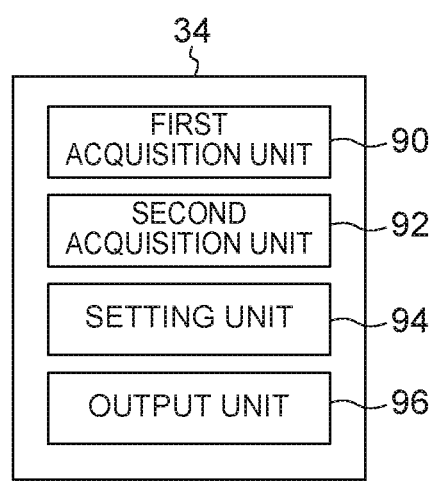
FIG. 2 is a functional block diagram of the server.

The server 34 reads the driving behavior evaluation program 48 from the storage unit 40, opens the driving behavior evaluation program 48 in the memory 38, and executes the driving behavior evaluation program 48 opened in the memory 38 by the CPU 36, whereby it functions as a first acquisition unit 90, a second acquisition unit 92, a setting unit 94, and an output unit 96, shown in FIG. 2, and performs a driving behavior evaluation process described later. Thereby, the server 34 functions as an example of the driving behavior evaluation device. Further, the server 34 stores the received sensor data in the sensor data storage area 50 every time sensor data is received from the vehicle-mounted system 12. As a result, the sensor data is stored in the sensor data storage area 50 in time series.

The mechanism of the present embodiment is described next. The server 34 executes the driving behavior evaluation process shown in FIG. 3 periodically (for example, once a day to once a week or the like) and for each in-vehicle system 12 (i.e., for each driver).

In step 100, the setting unit 94 categorizes the age group of the driver driving the vehicle that is the processing target, based on attribute information including the age of the driver previously registered and stored in the storage unit 40 for each vehicle equipped with the in-vehicle system 12. Here, when the categorized age group of the driver is an age group corresponding to the elderly, for example, in the evaluation of the driving behavior described later, the diagnosis may be changed so that the driver is higher risk.

In step 102, the first acquisition unit 90 acquires the sensor data of the processing target vehicle from the sensor data storage area 50 of the storage unit 40. In step 104, the second obtaining unit 92 obtains the map data 46 from the storage unit 40.

In step 106, the setting unit 94 reads the sensor data acquired in step 102 in chronological order. The setting unit 94 further plots the vehicle position represented by the time-series GNSS positioning information included in the read sensor data, in order, on the map represented by the map data 46 obtained in step 104, and it is determined whether or not the plot position on the map has reached a stop position corresponding to a stop line at an intersection. If the determination is negative, the determination of step 106 is repeated. When the plot position on the map reaches the temporary stop position, the determination in step 106 is affirmative, and the process proceeds to step 108.

In Step 108, the setting unit 94 starts measuring the elapsed time from when the temporary stop position is reached. In step 110, the setting unit 94 determines whether or not the brake pedal is depressed within a predetermined time after reaching the temporary stop position, while reading the sensor data after reaching the temporary stop position in chronological order. If the result of the determination in step 110 is negative, the process proceeds to step 112. In step 112, the setting unit 94 determines whether or not a predetermined time has elapsed since the stop position was reached.

When the determination in step 112 is negative, the process proceeds to step 114, and in step 114, the setting unit 94 determines whether or not the accelerator pedal is depressed within a predetermined time after reaching the temporary stop position. If the determination in step 114 is negative, the process returns to step 110, and steps 110 to 114 are repeated while reading the sensor data in chronological order until any of the determinations in steps 110 to 114 is affirmative.

Here, when the brake pedal is depressed within a predetermined time after reaching the temporary stop position, it may be determined that this driving action is an appropriate driving action intended for safety. Therefore, when the determination in step 110 is affirmative, the process proceeds to step 120, and in step 120, the setting unit 94 sets the driver who has been driving the processing target vehicle as a "low-risk driver." Then, the evaluation result of "low-risk driver" is stored in the driving behavior evaluation result storage area 52.

Further, if neither the brake pedal nor the accelerator pedal has been depressed for a predetermined period of time or longer after reaching the temporary stop position, the determination in step 112 is affirmative, and the process proceeds to step 122. In step 122, the setting unit 94 sets the driver who has been driving the processing target vehicle as a "medium risk driver." Then, the evaluation result of "medium-risk driver" is stored in the driving behavior evaluation result storage area 52.

Figure 4:
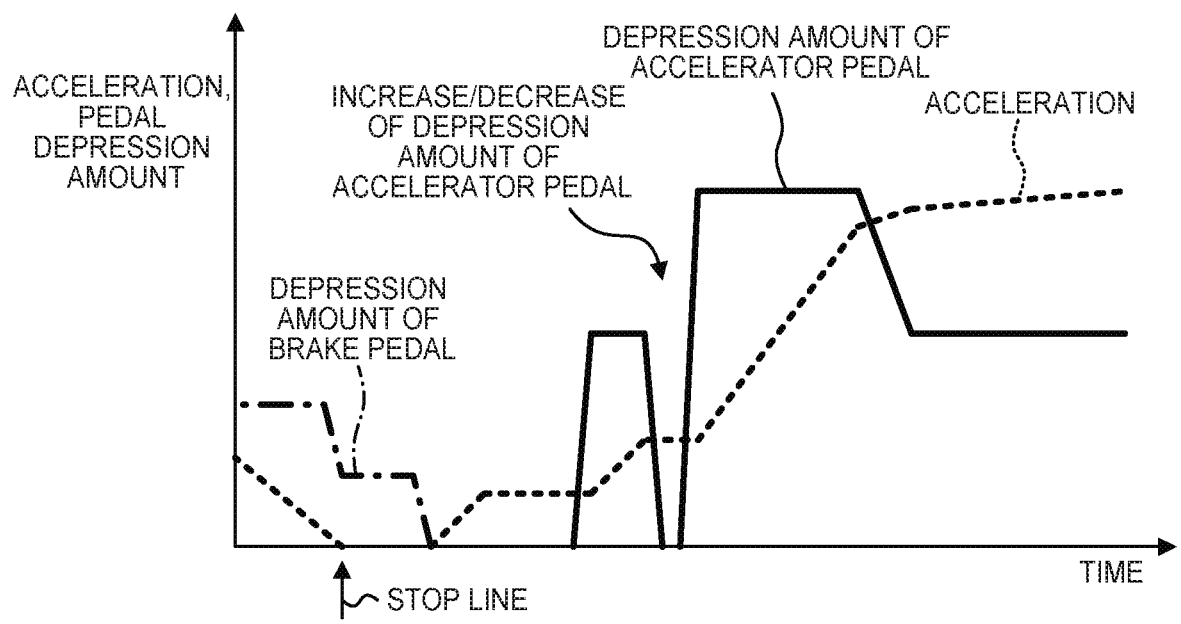
FIG. 4 is a diagram illustrating an example of the driving behavior set as "high-risk driver.

Further, if the accelerator pedal has been depressed within a predetermined period of time after reaching the temporary stop position, the determination in step 114 is affirmative, and the process proceeds to step 116. In step 116, the setting unit 94 determines whether or not the depression amount of the accelerator pedal has been increased or decreased at least once within a predetermined time after reaching the temporary stop position, as shown, for example, in FIG. 4. The increase or decrease in the amount of depression of the accelerator pedal may be detected, for example, by differentiating the amount of depression of the accelerator pedal and counting the number of times that the amount of depression of the accelerator pedal has become minimal.

According to experiments conducted by the inventors of the present application, for elderly people and the like, when passing through an intersection provided with a stop line, it is clear that the dangerous driving behavior of depressing the accelerator pedal even in a situation in which a vehicle passes from the side on the intersecting road will be observed, and that at that time, the attribute that the depression amount of the accelerator pedal is increased or decreased at least once will be observed.

Therefore, if the determination in step 116 is affirmative, it may be determined that the driving behavior is dangerous, and the process proceeds to step 124. In step 124, the setting unit 94 sets the driver who has been driving the processing target vehicle as a "high-risk driver." Then, the evaluation result of "high-risk driver" is stored in the driving behavior evaluation result storage area 52.

Figure 5:
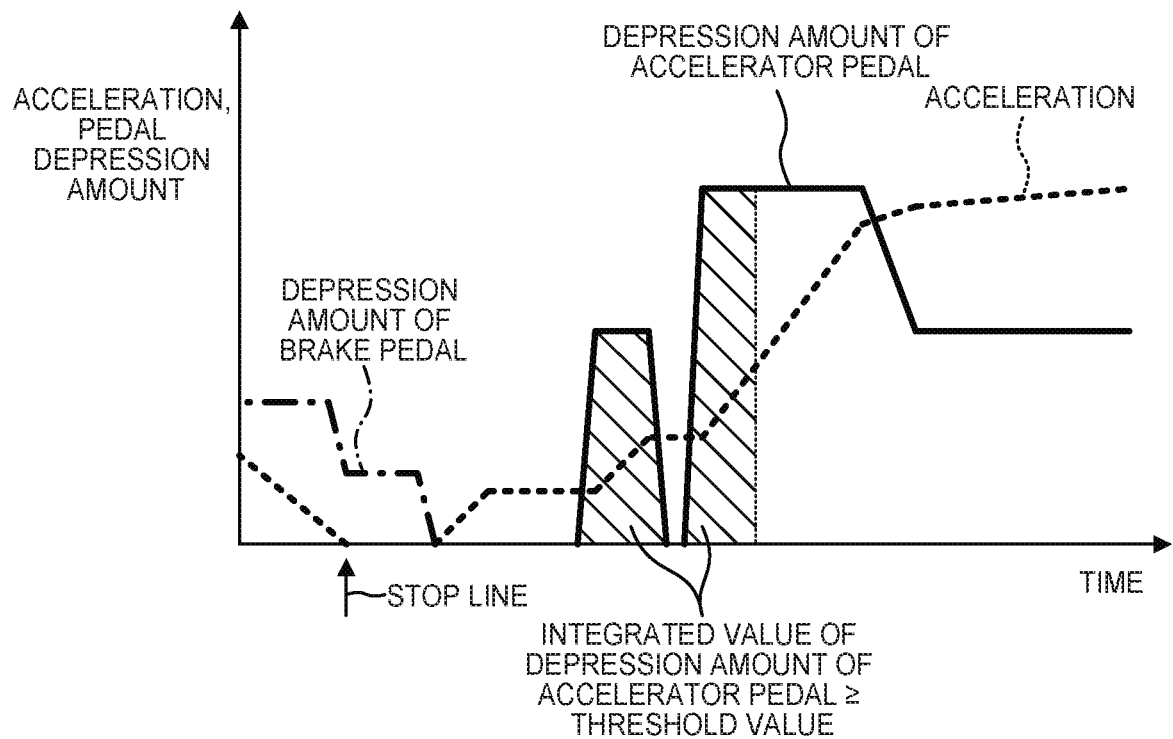
"
FIG. 5 is a diagram illustrating an example of the driving behavior set as "high-risk driver.

Further, if the determination in step 116 is negative, the process proceeds to step 118. In step 118, the setting unit 94 determines whether or not an integrated value of the depression amount of the accelerator pedal is equal to or larger than a threshold value within a predetermined time after reaching the temporary stop position, as shown in, for example, FIG. 5.

According to experiments conducted by the inventors of the present application, for elderly people and the like, when passing through an intersection provided with a stop line, it is clear that the dangerous driving behavior of depressing the accelerator pedal even in a situation in which a vehicle passes from the side on the intersecting road will be observed, and that at that time, the attributes that the depression amount of the accelerator pedal is large and the depression time is long will be observed.

Therefore, since it may also be determined that the driving behavior is dangerous if the determination in step 118 is affirmative, the process proceeds to step 124. In step 124, the setting unit 94 sets the driver who has been driving the processing target vehicle as a "high-risk driver." Then, the evaluation result of "high-risk driver" is stored in the driving behavior evaluation result storage area 52.

If the determination in step 118 is negative, that is, if the accelerator pedal is depressed but there is no increase or decrease in the amount of depression of the accelerator pedal and the integral value of the amount of depression of the accelerator pedal is less than the threshold value, the process proceeds to step 122. In step 122, the setting unit 94 sets the driver who has been driving the processing target vehicle as a "medium risk driver" and stores the driver in the driving behavior evaluation result storage area 52.

When the driving behavior is determined in step 120, step 122, or step 124, the process proceeds to step 126. In step 126, the output unit 96 outputs the driving behavior evaluation result stored in the driving behavior evaluation result storage area 52 to at least one of the in-vehicle system 12 or the terminal device 54, and ends the driving behavior evaluation processing.

The evaluation result of the driving behavior output in step 126 is displayed on at least one of the display unit 32 of the in-vehicle system 12 or the display unit 55 of the terminal device 54. This allows the driver and his/her family to be aware of the evaluation result of the driving behavior for the driver.

As described above, in the present embodiment, the first acquisition unit 90 acquires the on-vehicle sensor information including the depression amount of the accelerator pedal detected by the sensor group 24 mounted on the vehicle, and the second acquisition unit 92 acquires the map data 46 including information regarding intersections. When the setting unit 94 detects a first event in which the depression amount of the accelerator pedal increases or decreases at least once within a predetermined time after the vehicle temporarily stops at an intersection, the driving evaluation is set lower than in a case in which the first event is not detected. This makes it possible to accurately determine dangerous driving behavior by an elderly person or the like and perform appropriate driving evaluation.

Further, in the present embodiment, when the first event is not detected, after the vehicle reaches the temporary stop position at the intersection or after the vehicle has temporarily stopped, it is determined whether or not a second event has been detected in which the integrated value of the accelerator pedal depression amount within a predetermined time is equal to or greater than a threshold value. Then, when the first event is detected, and when the first event is not detected but the second event is detected, the driving evaluation is set lower than when neither the first event nor the second event is detected. This makes it possible to even more accurately determine dangerous driving behavior by an elderly person or the like and perform appropriate driving evaluation.

Further, in the present embodiment, the first acquisition unit 90 acquires the on-vehicle sensor information including the depression amount of the accelerator pedal detected by the sensor group 24 mounted on the vehicle, and the second acquisition unit 92 acquires the map data 46 including information regarding intersections. When the setting unit 94 detects a second event in which the integrated value of the accelerator pedal depression amount within a predetermined time after the vehicle has temporarily stopped at an intersection is equal to or greater than a threshold value, the driving evaluation is set lower than in a case in which the second event is not detected. This makes it possible to accurately determine dangerous driving behavior by an elderly person or the like and perform appropriate driving evaluation.

In the present embodiment, the output unit 96 causes the result of the driving evaluation set by the setting unit 94 to be displayed on at least one of the display unit 32 of the vehicle or the display unit 55 of the terminal device 54. This allows a person who has visually perceived the information displayed on the display unit 32 and/or the display unit 55 to be aware of the result of the set driving evaluation.

Figure 3:
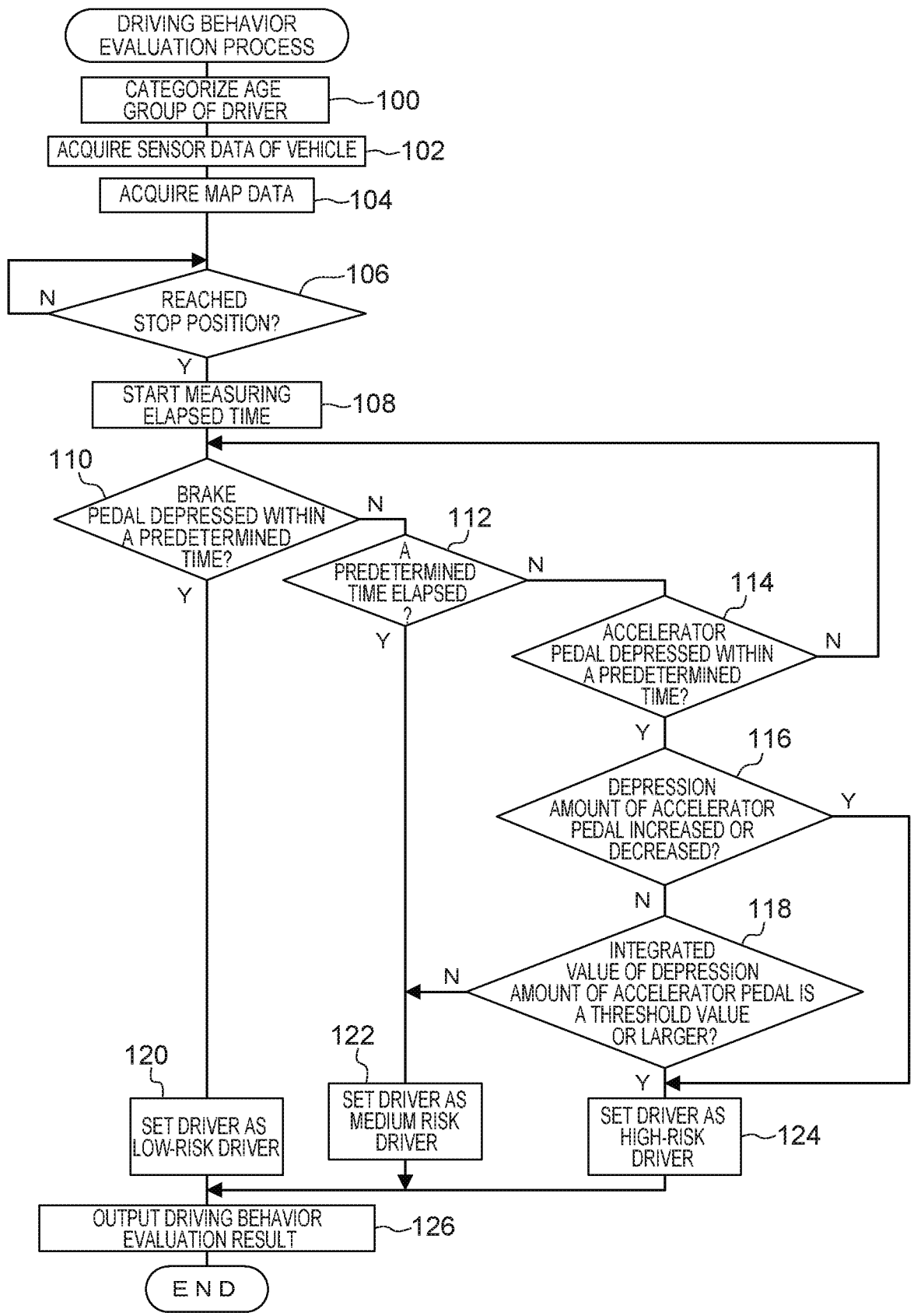
FIG. 3 is a flowchart illustrating the driving behavior evaluation processing.

In the above, a mode in which it is determined whether or not the vehicle has reached the temporary stop position in step 106 of FIG. 3 has been described. However, the embodiment is not limited thereto, and instead, it may be determined whether or not the vehicle has stopped at the temporary stop position.

Further, in the above, an aspect has been explained in which, in step 116 of FIG. 3, it is determined whether or not the depression amount of the accelerator pedal has increased or decreased at least once within a predetermined time after reaching the temporary stop position, and when the determination in step 116 is negative, it is determined in step 118 whether or not the integrated value of the amount of depression of the accelerator pedal is equal to or larger than the threshold value within a predetermined time after reaching the temporary stop position. However, the present invention is not limited thereto, and one of the determinations in step 116 and step 118 may be performed alone to evaluate the driving.

In the above description, a mode in which the driving behavior is evaluated based on the driving behavior when the vehicle has passed through the intersection once has been described, but the embodiment is not limited thereto. For example, the driving behavior may be evaluated based on a frequency of determination of dangerous driving in each instance of driving behavior when passing through an intersection several times.

Furthermore, in the above, a mode in which the server 34 executes the driving behavior evaluation process (FIG. 3) has been described, but the embodiment is not limited thereto. For example, the processing may be executed by the in-vehicle system 12. In this case, the in-vehicle system 12 functions as a driving behavior evaluation device.

In the above description, a mode in which the driving behavior evaluation process (FIG. 3) is executed periodically (for example, once a day to once a week or the like) has been described, but the embodiment is not limited thereto. For example, a determination may be made in real time for a driving action such as passing an intersection. In this case, for example, the evaluation result of the driving behavior may be immediately displayed on the screen of the navigation system 30 displayed on the display unit 32. When the evaluation result of the driving behavior is "high-risk driver," it is determined that the driver is an elderly person or the like, and for example, processing may be performed such as setting the operation determination threshold of a driving support system low so that a driving support system is easily activated or increasing the volume of an alarm.

EXAMPLES

Hereinafter, experiments performed by the present inventors will be described. In these experiments, the driving simulator reproduced a situation where when traveling straight through an intersection provided with a stop line, a vehicle passes along the intersecting road from the side, and the driving behavior of traveling straight at the intersection by the test subject operating the driving simulator and performing driving behavior was recorded. Further, the present inventors analyzed and examined the recorded driving behavior.

Figure 6:
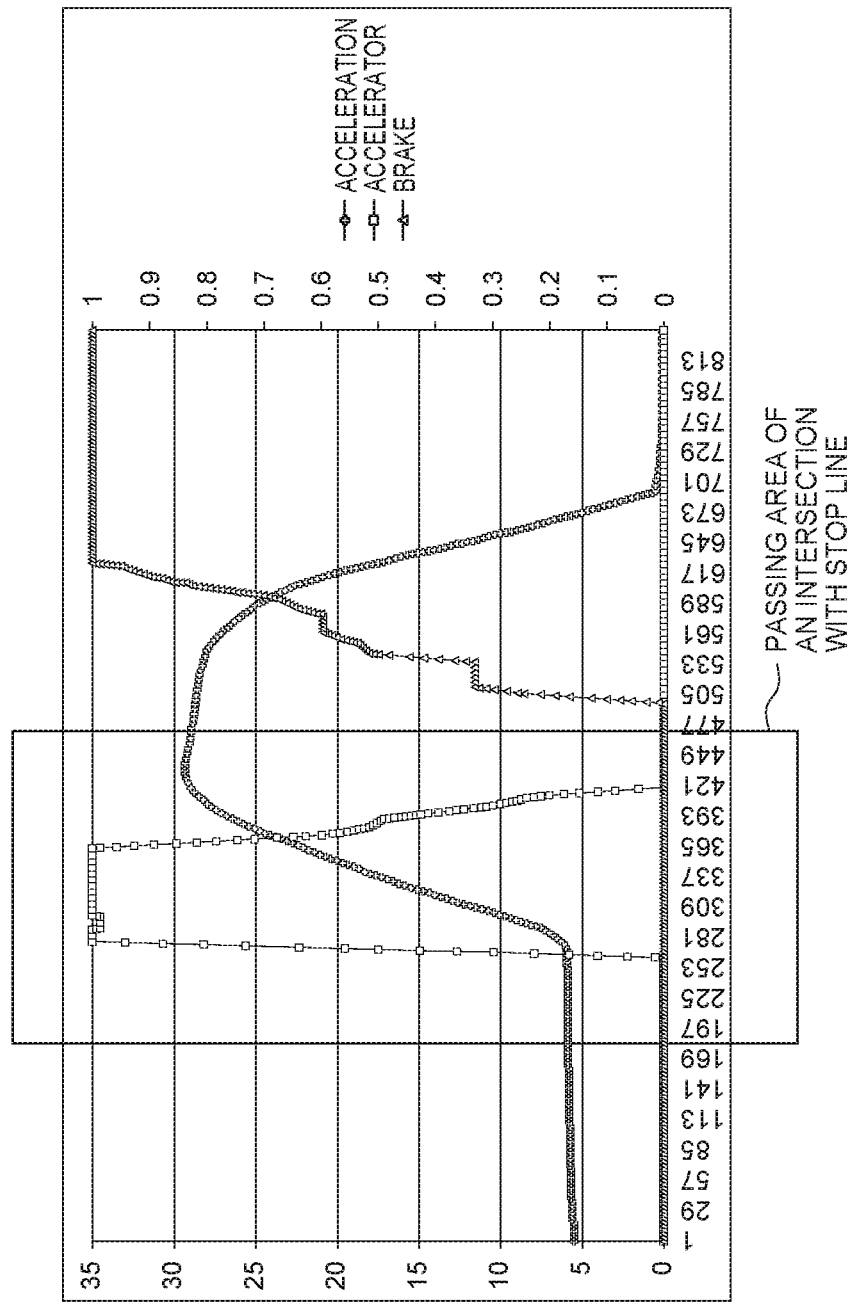
"
FIG. 6 is a diagram showing an example of the results of recording the driving behavior of the elderly in an experiment conducted by the present inventors.
Figure 7:
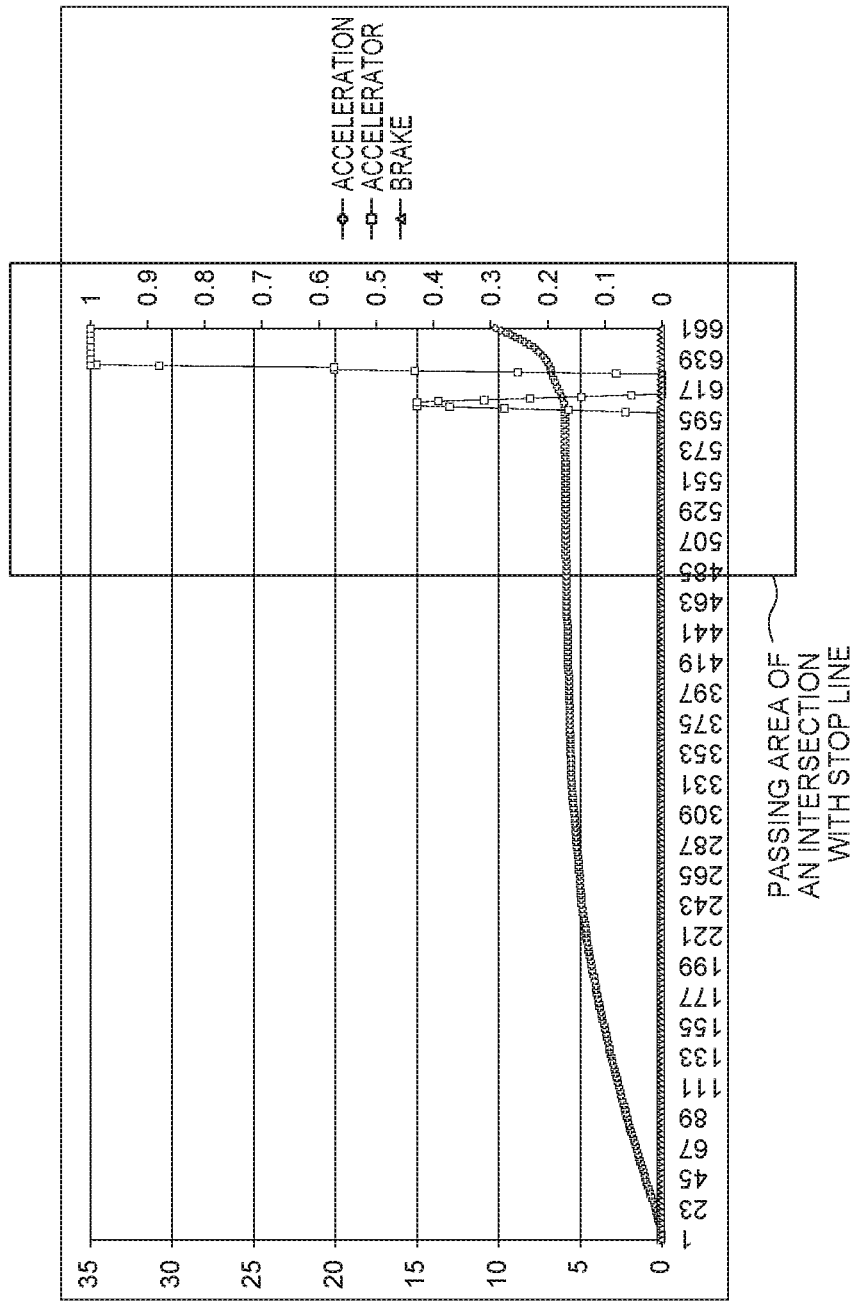
FIG. 7 is a diagram showing an example of the results of recording the driving behavior of the elderly in an experiment conducted by the present inventors.
Figure 8:
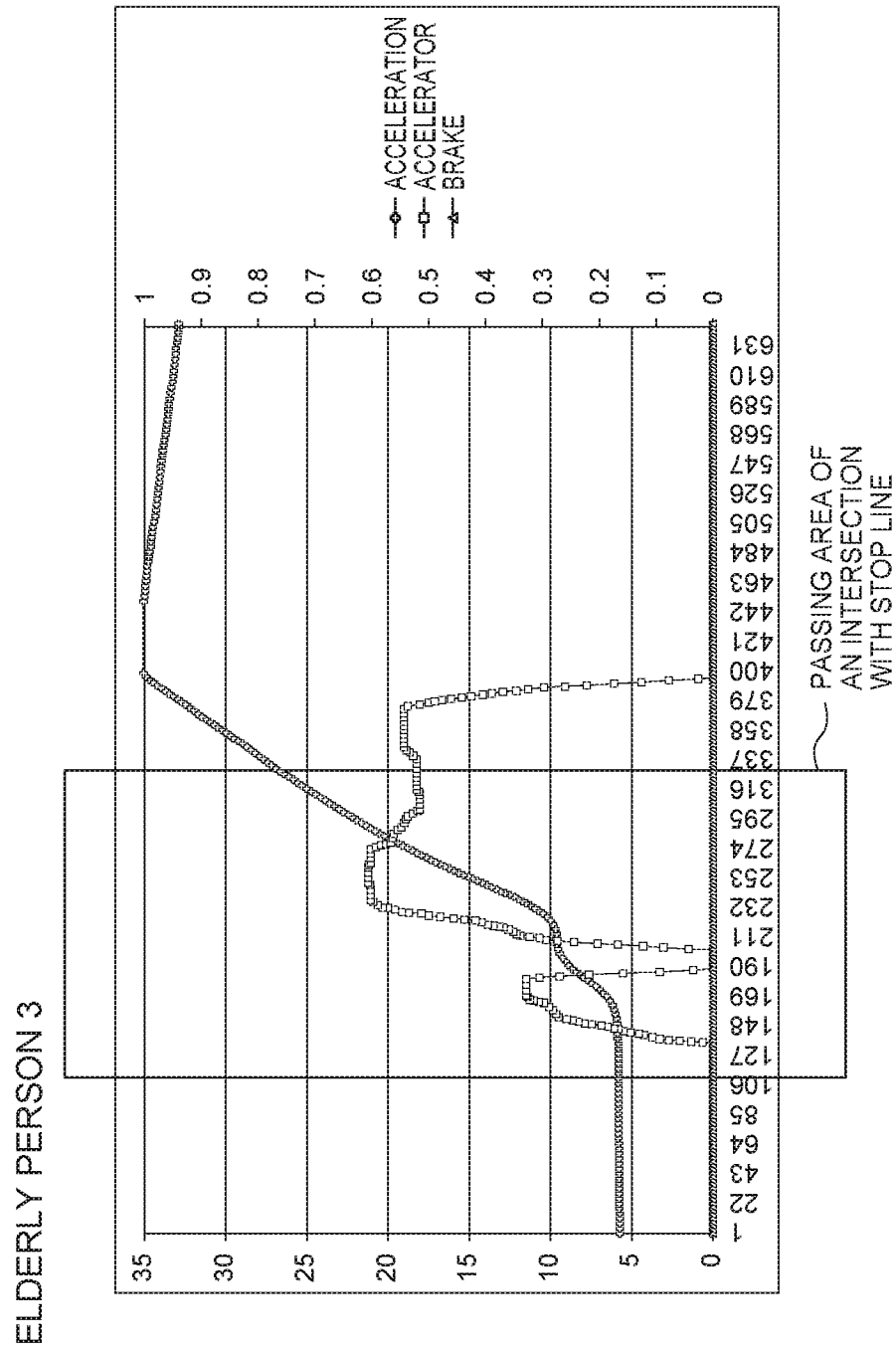
FIG. 8 is a diagram showing an example of the results of recording the driving behavior of the elderly in an experiment conducted by the present inventors.
Figure 9:
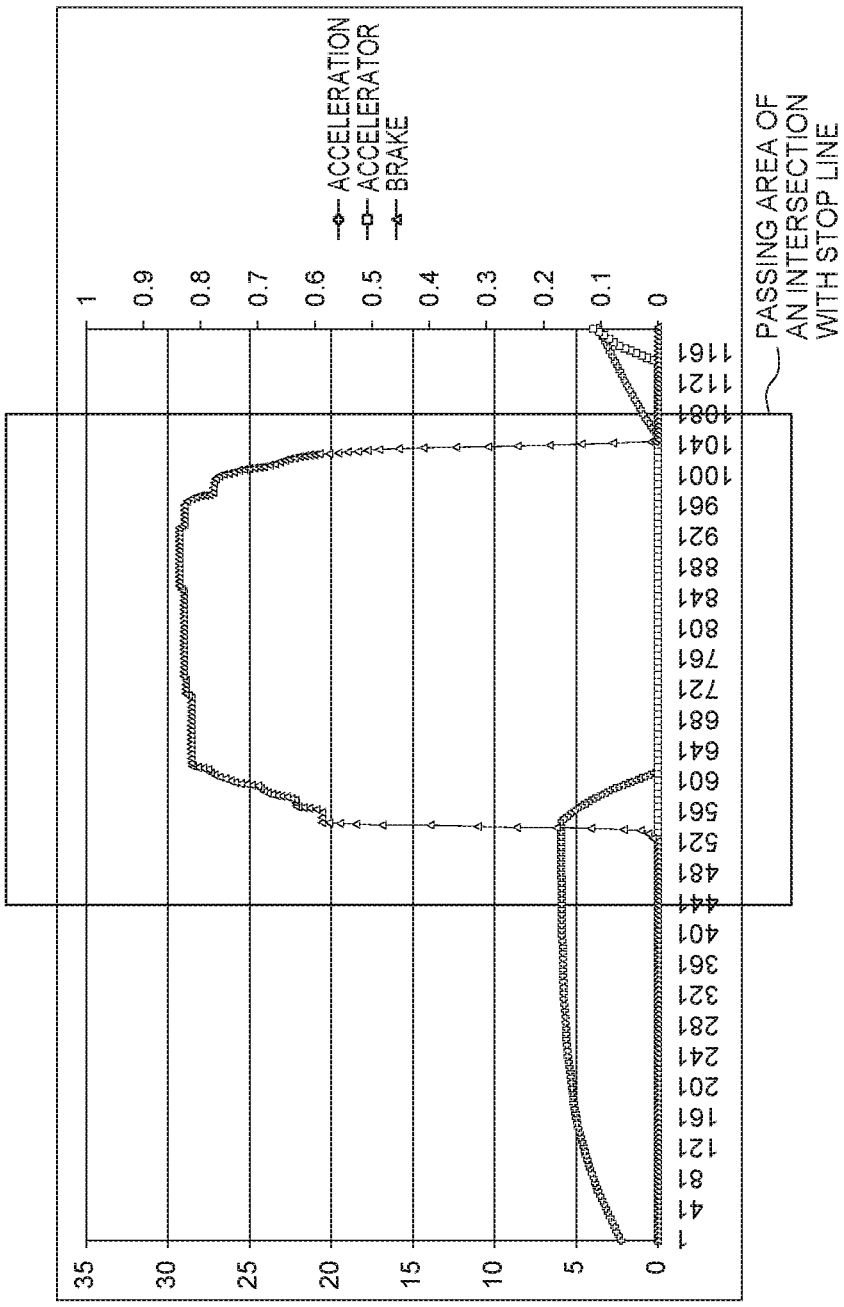
FIG. 9 is a diagram showing an example of the results of recording the driving behavior of the non-elderly in an experiment conducted by the present inventors.
Figure 10:
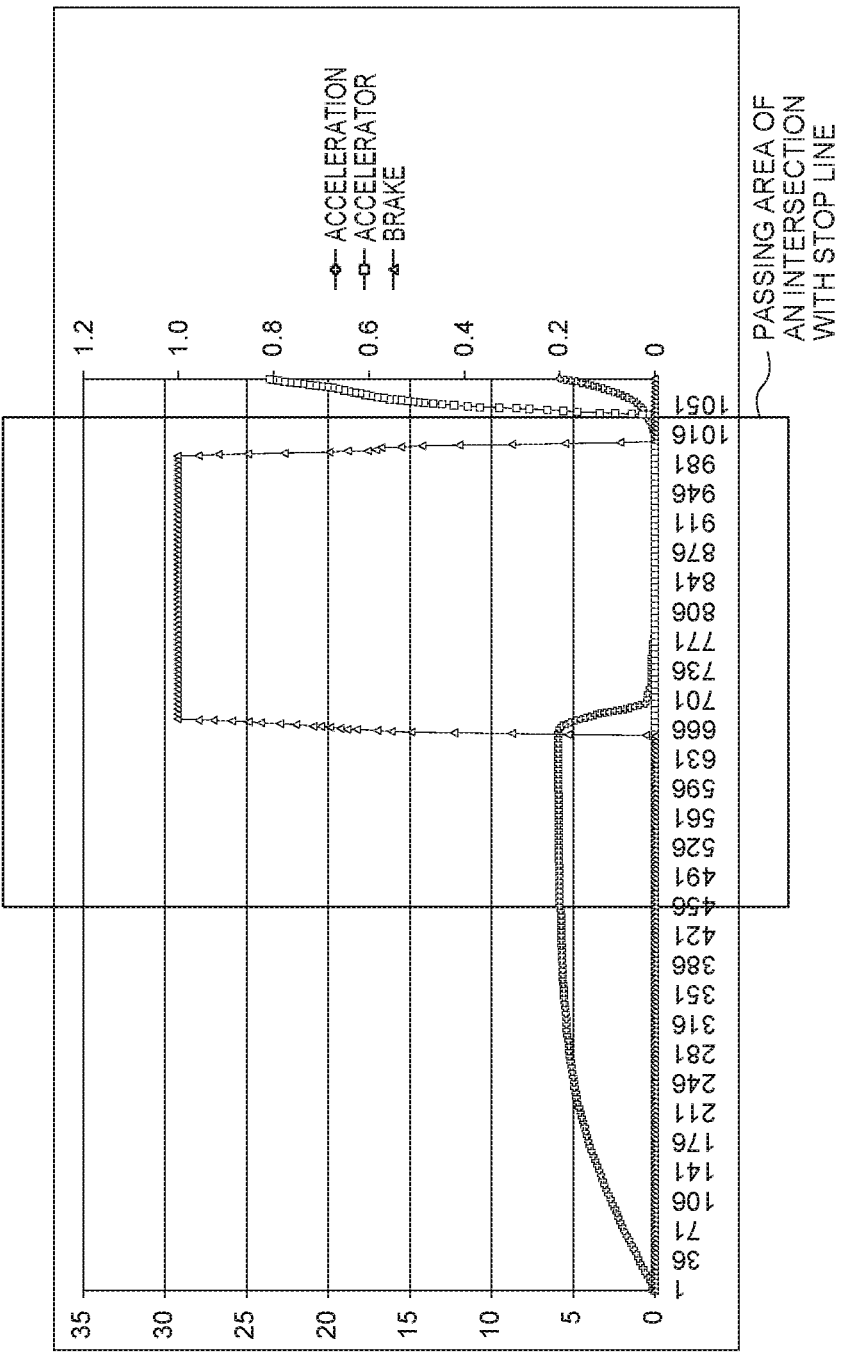
FIG. 10 is a diagram showing an example of the results of recording the driving behavior of the non-elderly in an experiment conducted by the present inventors.

The subjects were multiple elderly and non-elderly persons. FIGS. 6 to 8 show examples of the driving behavior obtained for the elderly, and FIGS. 9 and 10 show examples of the driving behavior obtained for the non-elderly. FIGS. 6 to 10 each show driving actions from when the vehicle has been temporarily stopped at the stop line.

As shown in FIGS. 9 and 10, the non-elderly person performs a two-stage stop by operating the brake pedal in response to the situation where a vehicle is coming from the side, and thus it may be said that a safe driving action is performed. On the other hand, as shown in FIG. 6 to FIG. 8, since, in response to the situation where a vehicle comes from the side, the elderly person depresses the accelerator pedal without performing a two-stage stop, and crosses the intersection ahead of the vehicle coming from the side, it may be said that dangerous driving behavior is being performed.

However, the technology described in Japanese Patent Application Laid-Open No. 2007-328612 discloses that when the distance between the stop line and the intersection entrance is short, it is presumed that safe driving behavior is being performed even in cases where the vehicle stops only at the stop line. Therefore, depending on the intersection (depending on the distance between the stop line and the intersection entrance), the driving behavior shown in FIGS. 6 to 8 may be erroneously determined to be safe driving behavior.

In contrast, according to the analysis and examination by the present inventors, it was found that all of the driving behaviors shown in FIGS. 6 to 8 have a common feature that the depression amount of the accelerator pedal is increased or decreased at least once. Based on this, when a first event, in which the amount of depression of the accelerator pedal is increased or decreased at least once within a predetermined time after the vehicle has temporarily stopped at the intersection, is detected, by setting the driving evaluation lower than in a case where the first event is not detected, it is clear that the above-mentioned driving behavior may be accurately determined to be, and evaluated as, dangerous driving behavior.

According to the analysis and examination by the inventors of the present application, it was found that all of the driving behaviors shown in FIGS. 6 to 8 have a common feature that the depression amount of the accelerator pedal is large and the depression time is long. Based on this, when a second event, in which an integrated value of the amount of depression of the accelerator pedal is equal to or greater than a threshold value within a predetermined time after the vehicle has temporarily stopped at the intersection, is detected, by setting the driving evaluation lower than in a case where the second event is not detected, it is clear that the above-mentioned driving behavior may be determined to be, and evaluated as, dangerous driving behavior.

What is claimed is:

1. A driving behavior evaluation device, comprising:
a server including a storage configured to store map information;
a memory; and
a processor coupled to the memory, the processor being configured to:
acquire onboard sensor information that is detected by a sensor installed in a vehicle and that includes a depression amount of an accelerator pedal,
acquire, from the server, the map information including information regarding an intersection, and
in a case in which a first event has been detected, render a lower driving evaluation than in a case in which the first event is not detected, the first event being an event in which the depression amount of the accelerator pedal increases or decreases at least once within a predetermined time after the vehicle has arrived at a temporary stop position, or has temporarily stopped, at the intersection.

2. The driving behavior evaluation device of claim 1, wherein, the processor is further configured to:
in a case in which the first event is not detected, determine whether or not a second event has been detected, the second event being an event in which an integrated value of the depression amount of the accelerator pedal is equal to or greater than a threshold value within a predetermined time after the vehicle has arrived at the temporary stop position, or has temporarily stopped, at the intersection and,
in a case in which the first event has been detected, or in a case in which the first event is not detected and the second event has been detected, the processor renders a lower driving evaluation than in a case in which the first and second events are not detected.

3. The driving behavior evaluation device of claim 1, further comprising an output unit configured to cause a display unit to display results of the rendered driving evaluation.

4. A driving behavior evaluation device, comprising:
a server including a storage configured to store map information;
a memory; and
a processor coupled to the memory, the processor being configured to:
acquire onboard sensor information that is detected by a sensor installed in a vehicle and that includes a depression amount of an accelerator pedal,
acquire, from the server, the map information including information regarding an intersection, and
in a case in which an event has been detected, render a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

5. The driving behavior evaluation device of claim 4, further comprising an output unit configured to cause a display unit to display results of the rendered driving evaluation.

6. A non-transitory storage medium storing a program that causes a computer to execute driving behavior evaluation processing, the driving behavior evaluation processing comprising:

acquiring onboard sensor information that is detected by a sensor installed in a vehicle and that includes a depression amount of an accelerator pedal;

acquiring map information from a storage of a server, wherein the map information includes information regarding an intersection; and in a case in which an event has been detected, rendering a lower driving evaluation than in a case in which the event is not detected, the event being an event in which the depression amount of the accelerator pedal increases or decreases at least once within a predetermined time after the vehicle has arrived at a temporary stop position, or has temporarily stopped, at the intersection.

7. A non-transitory storage medium storing a program that causes a computer to execute driving behavior evaluation processing, the driving behavior evaluation processing comprising:

acquiring onboard sensor information that is detected by a sensor installed in a vehicle and that includes a depression amount of an accelerator pedal;

acquiring map information from a storage of a server, wherein the map information includes information regarding an intersection; and in a case in which an event has been detected, rendering a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

8. A method of evaluating driving behavior, the method comprising:

acquiring onboard sensor information that is detected by a sensor installed in a vehicle and that includes a depression amount of an accelerator pedal;

acquiring map information from a storage of a server, wherein the map information includes information regarding an intersection; and in a case in which a first event has been detected, rendering a lower driving evaluation than in a case in which the event is not detected, the event being an event in which the depression amount of the accelerator pedal increases or decreases at least once within a predetermined time after the vehicle has arrived at a temporary stop position, or has temporarily stopped, at the intersection.

9. A method of evaluating driving behavior, the method comprising:

acquiring onboard sensor information that is detected by a sensor installed in a vehicle and that includes a depression amount of an accelerator pedal;

acquiring map information from a storage of a server, wherein the map information includes information regarding an intersection; and in a case in which an event has been detected, rendering a lower driving evaluation than in a case in which the event is not detected, the event being an event in which an integrated value of the depression amount of the accelerator pedal is equal to or greater than a threshold value within a predetermined time after the vehicle has arrived at the temporary stop position, or has temporarily stopped, at the intersection.

* * * * *